United States Patent
Furrer et al.

(10) Patent No.: US 7,241,840 B2
(45) Date of Patent: Jul. 10, 2007

(54) PROCESS FOR CROSSLINKING THERMOPLASTIC POLYMERS WITH SILANES EMPLOYING PEROXIDE BLENDS AND THE RESULTING CROSSLINKED THERMOPLASTIC POLYMERS

(75) Inventors: Willy Furrer, Gingins (CH); Abdellatif Abderrazig, Meyrin (CH); Louis Boogh, Nyon (CH)

(73) Assignee: Momentive Performance Materials Inc., Wilton, CT (US)

( * ) Notice: Subject to any disclaimer, the term of this patent is extended or adjusted under 35 U.S.C. 154(b) by 0 days.

(21) Appl. No.: 11/446,423

(22) Filed: Jun. 2, 2006

(65) Prior Publication Data

US 2006/0223952 A1    Oct. 5, 2006

Related U.S. Application Data

(62) Division of application No. 10/660,916, filed on Sep. 12, 2003.

(51) Int. Cl.
*C08C 19/25* (2006.01)
*C08C 19/04* (2006.01)

(52) U.S. Cl. .................. 525/333.7; 525/342; 525/387; 526/348

(58) Field of Classification Search ................ 525/342, 525/387, 333.7; 526/348
See application file for complete search history.

(56) References Cited

U.S. PATENT DOCUMENTS

| 3,646,155 A | | 2/1972 | Scott et al. | |
|---|---|---|---|---|
| 3,939,133 A | * | 2/1976 | Roodvoets | 525/332.5 |
| 4,048,129 A | * | 9/1977 | Voigt | 525/262 |
| 4,117,195 A | | 9/1978 | Swarbrick et al. | |
| 4,252,906 A | | 2/1981 | Hosokawa et al. | |
| 4,255,524 A | * | 3/1981 | Dawans et al. | 521/54 |
| 4,412,042 A | | 10/1983 | Matsuura et al. | |
| 5,112,919 A | | 5/1992 | Furrer et al. | |
| 5,741,858 A | | 4/1998 | Brann et al. | |
| 5,744,553 A | | 4/1998 | Kempter | |
| 6,455,637 B1 | | 9/2002 | Jackson et al. | |
| 6,864,323 B2 | | 3/2005 | Schlosser et al. | |
| 2003/0114604 A1 | | 6/2003 | Schlosser et al. | |

FOREIGN PATENT DOCUMENTS

EP    1288235    7/2002

\* cited by examiner

*Primary Examiner*—Roberto Rabago
(74) *Attorney, Agent, or Firm*—Dominick G. Vicari

(57) ABSTRACT

A composition comprising at least one silane possessing an unsaturated organic function; at least two free radical initiators, and a process for producing silane-crosslinked thermoplastic polymers comprising providing a cross-linkable compound; at least one thermoplastic polymer; and, reacting the crosslinkable compound under reactive mechanical-working conditions and exposing the crosslinkable compound to moisture to provide crosslinked thermoplastic polymers.

18 Claims, No Drawings

PROCESS FOR CROSSLINKING THERMOPLASTIC POLYMERS WITH SILANES EMPLOYING PEROXIDE BLENDS AND THE RESULTING CROSSLINKED THERMOPLASTIC POLYMERS

CROSS REFERENCE TO RELATED APPLICATIONS

This application is a divisional application of U.S. patent application Ser. No. 10/660,916 filed on Sep. 12, 2003.

BACKGROUND OF THE INVENTION

1. Field of the Invention

This invention relates to a composition comprising silane crosslinkers and two or more free radical initiators with different half-life temperatures and a process of crosslinking thermoplastic polymers with silane crosslinker in the presence of a blend or mixture of free radical initiators. The invention further relates to the moisture crosslinked thermoplastic polymers resulting from the process.

2. Description of Related Art

For many applications, e.g., wire and cable insulation, weatherstripping, fibers, seals, gaskets, foams, footware, flexible tubing, pipes, bellows, tapes, etc., certain selected properties (e.g. tensile strength, compression set, thermal and chemical resistance) of articles manufactured from one or more thermoplastic polymers can be enhanced by introducing chemical linkages between the polymeric molecular chains which constitute the polymer, during or preferably following, the shaping or molding process. These chemical linkages between different polymeric molecular chains are commonly referred to as "crosslinks". Crosslinks can be introduced between different molecular chains of a thermoplastic polymer by a number of mechanisms, one of which is to graft to the individual polymer backbones or chains that constitute the bulk polymer with a chemically reactive compound in such a manner that the grafted compound on one backbone may subsequently react with a similar grafted compound on another backbone to form the crosslink. Exemplary of this process is the "silane crosslinking" process.

This process employs a silane-containing compound that crosslinks these thermoplastic polymer compounds. Silanes can be grafted to a suitable thermoplastic polymer by the use of a suitable quantity of organic peroxide or other free radical initiator, either before or during a shaping or molding operation. Additional ingredients such as stabilizers, pigments, fillers, catalysts, processing aids etc., may also be included in the mixture.

When using silane-peroxide blends for thermoplastic polymer crosslinking, a compromise must be made between grafting efficiency and process efficiency, such as extrusion rate and run times. The formation of a cross-linkable material by this means is, however, difficult to carry out since it requires critical control of the process. If the process is carried too far, the thermoplastic polymer may partially cross-link and solidify in the processing apparatus, for example an extruder, with consequent difficulties in achieving consistent good quality products and delays involved in removing the partially cross-linked product from the processing equipment. Care must also be exercised to ensure that articles prepared from the polymer retain their shape during subsequent heating to bring about the cross-linking process.

It has been observed that gel formation, screw-build up and scorching may result when using highly reactive silane-peroxide blends. This is particularly significant for processes using conditions and processing equipment that impose severe melting and mixing conditions leading to high shearing stresses in the polyolefin. These problems generally arise due to early and eventually complete activation of the peroxide during the initial melting and homogeneisation process. The prior art has dealt with these problems by using less reactive silane blends but this approach can diminish the grafting efficiency of the crosslinkable thermoplastic polymers.

U.S. Pat. No. 3,646,155 describes the crosslinking of polyolefins by the reaction of polyolefin with an unsaturated hydrolysable silane at a temperature above 140° C. in the presence of a compound capable of generating free radical sites in the polyolefin.

U.S. Pat. No. 4,252,906 describes a process using a crosslinkable polyethylene resin composition comprising a silane-modified polyethylene resin and an organic peroxide.

U.S. Pat. No. 4,117,195 describes what is commercially known as the monosil process of making a crosslinked extruded product from polyethylene or other suitable polymer.

U.S. Pat. No. 4,412,042 describes a process for preparing polyolefins cross-linked by a silane linkage. This is accomplished by reacting a silane with an ethylene/α-olefin copolymer of a specific density in the presence of a free radical generating agent, e.g., a benzoyl peroxide.

U.S. Pat. No. 5,112,919 describes what is commercially known as the XL-Pearl process involving the solid feeding of silane cross-linking agents into an extruder.

U.S. Pat. No. 5,741,858 discloses a silane-crosslinked blend comprising a polyolefin elastomer, a crystalline polyolefin polymer, a silane crosslinker and preferably a peroxide initiator.

U.S. Pat. No. 5,744,553 describes what is commercially known as the spherisil process.

U.S. Pat. No. 6,455,637 discloses a coating material formed by the process of reacting a polyolefin with a silane in the presence of a free-radical initiator.

EP 1288235 describes a composition for cross-linked polymers that exhibit scorch and gel formation reduction properties. This reference is incorporated by reference herein.

There remains a need for a means of crosslinking polyolefins and other silane crosslinkable thermoplastic polymers under reactive mechanical-working conditions using silane crosslinkers and free radical initiators while minimizing such aforenoted problems as gel formation, screw-buildup and/or scorching while maintaining a high level of grafting (crosslinking) efficiency.

SUMMARY OF THE INVENTION

It is an object of the present invention to provide a composition comprising silane crosslinkers and two or more free radical initiators with different half-life temperatures and a process of crosslinking thermoplastic polymers by reacting thermoplastic polymers with silanes and/or a blend of silanes and a blend of free radical initiators under reactive mechanical-working conditions.

It is a further object of the invention to provide a process of crosslinking thermoplastic polymers under reactive mechanical-working conditions that will minimize the occurrence of gel formation, screw-buildup and/or scorching while maintaining high crosslinking efficiency.

In keeping with these and other objects of the invention, there is provided a composition comprising:
  (i) at least one silane possessing an unsaturated organic function;
  (ii) at least two free radical initiators, the first initiator having a first half-life temperature and the second initiator having a second half-life temperature, said second half-life temperature being higher than said first half-life temperature;
  (iii) optionally one or more condensation catalysts;
  (iv) optionally, one or more stabilizers, stabilizer packages, inhibitors or free radical scavengers; and,
  (v) optionally, other additives such as fillers, colorants, processing aids, etc.

In further keeping with these and other objects of the invention, there is provided a process for producing silane-crosslinked thermoplastic polymers comprising:
  a) providing a cross-linkable compound comprising a mixture of:
    (i) at least one silane possessing an unsaturated organic function;
    (ii) at least two free radical initiators, the first initiator having a first half-life temperature and the second initiator having a second half-life temperature, said second half-life temperature being higher than said first half-life temperature;
    (iii) at least one thermoplastic polymer; and,
    (iv) optionally, one or more condensation catalysts; and,
    (v) optionally, one or more stabilizers, stabilizer packages, inhibitors or free radical scavengers; and,
    (vi) optionally, other additives such as fillers, colorants, processing aids, etc; to produce a cross-linkable compound; and,
  b) reacting the mixture of step (a) under reactive mechanical-working conditions and exposing the crosslinkable compound to moisture to provide crosslinked thermoplastic polymers.

The expression "reactive mechanical-working conditions" herein shall be understood to mean the conditions of elevated temperature and residence time prevailing within a mechanical-working apparatus such as an extruder and exposure to moisture, such conditions being sufficient to bring about the reactive processing, allowing free radical initiator activation and silane grafting onto the thermoplastic polymer, of a polyolefin contained in a mixture of at least a thermoplastic polymer, silane crosslinker and free radical initiator(s).

The process of the present invention enables the crosslinking of thermoplastic polymer to be carried out under less critical processing conditions than those which are normally obtained in connection with conventional peroxide crosslinking techniques. The present process also enables the reaction between the thermoplastic polymer, e.g., polyolefins and the silane to be effected relatively quickly, if desired in the absence of a solvent, and employing only minor amounts of silane and free radical initiators.

The process of the invention therefore lends itself to the preparation of a cross-linked thermoplastic polymer in conventional extrusion equipment and under conditions and in a time comparable to those normally employed for the compounding of such materials. Furthermore, the improved grafting efficiency of the present invention decreases the requirement for expensive silane and free radical initiator reactants.

The present invention employs a blend of free radical initiators possessing a range of half-life temperatures such that undesired early and/or concentrated activation of the free radical initiators is decreased and the broad range of half-life temperature allows for a homogenous level of activation and grafting throughout the reactive process which leads to an improved level of grafting efficiency and silane crosslinking efficiency in the compound. In addition, the use of free radical initiators containing a range of half-life temperatures has been observed to reduce the level of gel formation, screw buildup and/or scorching allowing for extended run-times.

DETAILED DESCRIPTION OF THE PREFERRED EMBODIMENTS

The crosslinkable thermoplastic polymers of the present invention include polyolefins, such as, one or more ce-olefins, α-olefin copolymers, α-olefin terpolymers and mixtures thereof. Examples of useful polyolefins include high-pressure low-density polyethylene, medium/low-pressure high-density polyethylene, low-pressure low-density polyethylene, medium-density polyethylene, an ethylene-α-olefin copolymer, polypropylene, an ethylene-ethyl acrylate copolymer, an ethylene-vinyl acetate copolymer, an ethylene-propylene copolymer, an ethylene-propylene-diene terpolymer, an ethylene-butene copolymer, polymethylpentane-1, polybutene, chlorinated polyethylene, an ethylene-vinyl acetate-chlorine terpolymer, and the like, and mixtures thereof.

The silane(s) with an unsaturated organic function can be any conventionally available silane(s) used in the silane cross-linking of polymers as is well known in the art. Advantageously, the silane(s) can be those of the general formula $RR'SiY_2$ wherein R represents a monovalently olefinically unsaturated hydrocarbon or hydrocarbonoxy radical, each Y represents a hydrolysable organic radical and R' represents an R radical or a Y radical, which is reactive with the free radical sites generated in the polyolefin. Examples of such radicals are vinyl, allyl, butenyl, cyclohexenyl, cyclopentadienyl, cyclohexadienyl, $$CH_2\!=\!\!C(CH_3)COO(CH_2)_3\!\!-\!\!,$$
$$CH_2\!=\!\!C(CH_3)COOCH_2CH_2O(CH_2)_3\!\!-\!\!\quad \text{and}$$

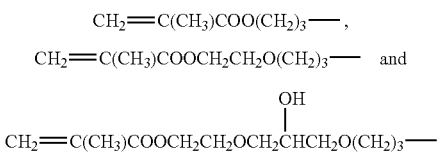

the vinyl radical being preferred. The group Y can represent any hydrolysable organic radical for example an alkyoxy radical such as the methoxy, ethoxy and butoxy radicals, an acyloxy radical, for example the formyloxy, acetoxy or propanoyloxy radicals, oximato radicals, e.g. $-\!ON\!=\!C(CH_3)_2$, $-\!ON\!=\!CCH_2C_2H_5$ and $-\!ON\!=\!C(C_6H_5)_2$ or substituted amino radicals, e.g. alkylamino and arylamino radicals, examples of which are $-\!NHCH_3$, $-\!NHC_2H_5$ and $-\!NH(C_6H_5)_2$. The group R' may represent an R group or a Y group. Preferably, the silane will contain three hydrolysable organic radicals, the most preferred silanes being vinyltriethoxysilane and vinyl trimethoxysilane.

The process of the invention employs a blend of at least two free radical initiators, preferably three, the first of which possesses a first half-life temperature and the second of which possesses a second half-life temperature greater than that of the first. The second 0.1 hour half-life temperature of the second free radical initiator is between 5° and 110° C.

greater than the 0.1 hour half-life temperature of the first free radical initiator. Preferably the second 0.1 hour half-life temperature of the second free radical initiator is between 30° to 90° C. greater than the 0.1 hour half-life temperature of the first free radical initiator. Most preferably the second 0.1 hour half-life temperature of the second free radical initiator is between 45° and 70° C. greater than the 0.1 hour half-life temperature of the first free radical initiator.

The first free radical initiator is preferably a peroxide and possesses a relatively low 0.1 hour half-life temperature, e.g. of from about 80° C. to about 160° C. and preferably from about 90° C. to about 155° C. as measured in a dilute solution of the initiators in monochlorobenzene. Suitable first free radical initiators and their range of 0.1 hour half-life temperatures are set forth in Table I as follows.

TABLE I

First Free Radical Initiator

| First Free Radical Initiator | Range of 0.1 hour half-life Temperatures [° C.] |
|---|---|
| Di(2,4-dichloro benzoyl)peroxide | 93 |
| Dilauroyl peroxide | 99 |
| Dibenzoyl peroxide | 113 |
| 1,1-Di(tert-butylperoxy)-3,3,5-trimethylcyclohexane | 128 |
| Tert-Butyl peroxybenzoate | 142 |
| Dicumyl peroxide | 154 |

In addition, other first free radical initiators can include tert-butyl peroxypivalate, tert-butyl peroxy-2-ethylhexanoate, di(tert-butylperoxy)cyclohexane, tert-butyl peroxy-3,5,5-trimethylhexanoate, tert-butyl peroxyacetate, di-tert-amyl peroxide, di(tert-butylperoxyisopropyl)benzene and 2,5-dimethyl-2,5-di(tert-butylperoxy)hexane, as well as any free radical initiator that is conventionally used or known.

The second free radical initiator, also preferably a peroxide, possesses a higher 0.1 hour half-life temperature than that of the first free radical initiator, e.g., on the order of from about 125° to about 190° C. and preferably from about 140° to about 170° C. Suitable second free radical initiators and their range of 0.1 hour half-life temperatures are set forth in Table II as follows.

TABLE II

Second Free Radical Initiators

| Second Free Radical Initiator | Range of 0.1 hour half-life Temperatures |
|---|---|
| Tert-Butyl peroxybenzoate | 142 |
| Dicumyl peroxide | 154 |
| Tert-butyl cumyl peroxide | 159 |
| 2,5-Dimethyl-2,5-di(tert-butylperoxy)hexyne-3 | 164 |

Additional second free radical initiators can include tert-butyl peroxyacetate, di-tert-amyl peroxide, di(tert-butylperoxyisopropyl)benzene, 2,5-dimethyl-2,5-di(tert-butylperoxy)hexane and di-tert-butyl peroxide, as well as any free radical initiator that is conventionally used or known.

The crosslinking process can further include the use of a condensation catalyst. A wide variety of materials which function as condensation catalysts for silanes are known in the art and any of such materials may be employed in the process of this invention. Such materials include for example metal carboxylates such as dibutyltin dilaurate, stannous acetate, stannous octoate, lead naphthenate, zinc octoate, iron-2-ethylhexoate and cobalt naphthenate, organic metal compounds such as the titanium esters and chelates, for example tetrabutyl titanate, tetranonyl titanate and bis (acetylacetonyl) di-isopropyl titanate, organic bases such as ethylamine, hexylamine, dibutylamine and piperidine and acids such as the mineral acids and fatty acids. The preferred catalysts are the organic tin compounds, for example, dibutyltin dilaurate, dibutyltin diacetate, and dibutyltin dioctoate.

Stabilizers and radical scavengers are also advantageously employed in the reaction of the blend of free radical initiators and silane(s).

In accordance with the process of this invention, the reaction between the thermoplastic polymer and the silane is carried out employing any suitable mechanical-working apparatus heretofore employed in the processing of polyolefins, e.g., a screw-type extruder, an internal Banbury mixer or a roll mill, provided, of course, that it results in bringing the composition to grafting temperature. The preferred apparatus for use in providing the crosslinkable polyolefin of this invention is an extruder adapted to effect a kneading or compounding action on its contents. Such extruder apparatus may include such optional features as a heating jacket to augment the heat produced within the extruder barrel and a vacuum port whereby any unreacted silane can be removed.

The thermoplastic polymer, silane crosslinker, free radical initiators and other components can be brought together by any convenient means. For example, the silane can be introduced into the apparatus in which the reaction is to take place dispersed on the surface of the thermoplastic polymer or it can be metered directly into the apparatus. The free radical initiators can also be introduced by way of the surface of the thermoplastic polymer and, when possible, dissolved in the silane. The silane and/or peroxide components can also be introduced as dry-silanes, absorbed on suitable mineral or organic carriers.

Reaction between the silane and thermoplastic polymer can be carried out at any suitable temperature between about the melting and about the degradation temperature of the polyolefin. The actual reaction temperature employed will normally be determined by considerations of the type of apparatus in which the reaction is performed and where appropriate on the power input for the apparatus and the compound viscosity profile. When the thermoplastic polymer is polyethylene, it is preferred to perform the reaction at temperatures similar to those usually met with during the processing of polyethylene, that is from about 140° to about 260° C. for periods from about 0.5 to about 10 minutes.

Crosslinking of thermoplastic polymer according to the process of this invention is accomplished in the presence of moisture. The moisture present in the atmosphere is usually sufficient to permit the cross-linking to occur but the rate of crosslinking may be hastened if desired by the use of an artificially moistened atmosphere or liquid water.

The invention is applicable to all processes used for the manufacturing of silane crosslinkable compounds or products where the silane is grafted onto the polymer backbone using radical grafting. Such processes include the One-Step Monosil process, the One-Step XL-PEarl process, the One-Step Spherisil P process, the Two-Step Sioplas process, and the One-Step Soaking process.

While any conventional method can be used to graft the silane crosslinker to the thermoplastic polymer, one preferred method is blending the thermoplastic polymer(s) with the initiator in the first stage of a reactor extruder, such as a single screw extruder, preferably one with a length/diameter (L/D) ratio of about 25:1 or greater. The grafting conditions can vary greatly depending on the compound formulation, but the melt temperatures are typically between about 160° and about 240° C., preferably between about 210° and about 230° C., depending upon the residence time and the half-life of the initiator.

The articles prepared from the crosslinked compositions of this invention can be filled or unfilled. If filled, then the amount of filler present should not exceed an amount that would cause degradation of the properties of interest in crosslinked composition. Typically, the amount of filler present is between about 0 and about 80 weight percent, preferably between about 20 and about 60 weight percent based on the weight of the composition. Representative fillers include kaolin clay, magnesium hydroxide, aluminum trihydroxide, silica and calcium carbonate. In a preferred embodiment of this invention in which a filler is present, the filler is coated with a material that will prevent or retard any tendency that the filler might otherwise have to interfere with the silane cure reaction. Stearic acid or silane coupling agents are illustrative of such a filler coating.

Other additives can be used in the preparation of and be present in the articles prepared from the crosslinked compositions of this invention, and includes antioxidants, processing aids, oils, plasticizers, pigments and lubricants.

The amounts of the various components of the present invention can vary greatly depending on the nature of the polyolefin and other components and the process of production of articles made from the silane crosslinked polyolefin (s). Preferably, the silane(s) and peroxides will be premixed, eventually with the catalyst(s), stabilizer(s), processing aid (s) and metal deactivator(s), and will be used at loading levels of from about 0.2 to 3 weight percent of the total crosslinkable compound. The composition of the silane(s), peroxides and eventual other additives shall preferably be characterized by the silane with an organic function present at loading levels of from about 50 to about 99.9% and more preferably from about 75 to about 98%. The blend of radical initiators will vary in amount as described above, depending on the desired range of radical initiator half-life temperatures and times. Preferably, in the present invention, the amount of radical initiators that are pre-blended in the silane will be in total weight of the blend from about 0.05 to about 15% and more preferably from about 2 to about 8%. The level of catalysts can be present in an amount of from 0 to about 10% and preferably from about 1 to about 5%. The total level of other additives which can preferably be included is from about 0 to about 25%.

The following examples are illustrative of the process of the invention for crosslinking polyolefin.

EXAMPLE 1

100 parts by weight of an extrusion molding grade of polyethylene pellets having a melt index of 0.2 and density of 0.922 g/cm$^3$ are coated by tumbling with 1.2 parts by weight of vinyltriethoxysilane having dissolved therein 2.5 parts by weight of 1,1 Di(tertbutylperoxy)-3,3,5-trimethylcyclohexane having a 0.1 hour half-life temperature of 128° C., 2.5 parts by weight of Di-tert-butyl peroxide having a 0.1 hour half-life temperature of 164° C. and 3 parts by weight of dibutyltin dilaurate condensation catalyst, until all of the liquid is taken up. The composition is then extruded in a single screw extruder under the following conditions:
Temperature of screw: 60° C.
Temperature of barrel zone 1: 170° C.
Temperature of barrel zone 2: 220° C.
Screw speed: 20 r.p.m.
The residence time of the polyethylene in the machine is approximately 1 to 2 minutes.

EXAMPLE 2

Composition:
Base polyethylene resin (Escorene LD 166 BA, with an MFL of 0.2 g/10 min at 190° C. under a load of 2.16 kg, and a density of 0.922 g/dm3): 98.8% by weight; and a premixed blend of silane, peroxide and catalyst (A-171 vinyltrimethoxy silane: 1.11% by weight; 1,1 Di(tertbutylperoxy)-3,3,5-trimethylcyclohexane: 0.028% by weight; Di-tert-butyl peroxide: 0.028% by weight; dibutyltin dilaurate condensation catalyst: 0.033% by weight): 1.2% by weight.

Process:
The pre-mixed blend of reactants was pre-soaked onto the polymer pellets prior to feeding into the extruder by mixing at room temperature for 4 hours. The thermoplastic polymer formulation was extruded on a Troester single screw extruder equipped with a barrier screw of a diameter of 45 mm and a length of 25 l/d. No breaker plate was used and the screw speed was set at 20 rpm. The feeding zone and screw were respectively cooled to 50° C. and 60° C. The barrel temperatures were set at 150° C. for the first zone with a regular increase until 220° C. in the last die zone. The resulting melt temperature was measured in the polymer at 226° C.

Example 2 developed a die pressure of 279 bar and gave a very smooth surface finish to the extrudate. The tensile strength at break was 17.3 MPa, the elongation at break was of 392%, and the hot-set measured at 15 min at 200° C. under a load of 0.2 MPa was of 50% with a permanent set of 0%.

COMPARATIVE EXAMPLE A

Composition:
Base polyethylene resin (Escorene LD 166 BA, with an MFL of 0.2 g/10 min at 190° C. under a load of 2.16 kg, and a density of 0.922 g/dm3): 98.8% by weight; and a standard but highly efficient commercially available premixed blend of silane, peroxide and catalyst containing only one peroxide (Silcat RHE): 1.2% by weight.

Process:
The commercial blend of reactants was pre-soaked onto the polymer pellets prior to feeding into the extruder by mixing at room temperature for 4 hours. The thermoplastic polymer formulation was extruded, identically to example 2, on a Troester single screw extruder equipped with a barrier screw of a diameter of 45 mm and a length of 25 l/d. No breaker plate was used and the screw speed was set at 20 rpm. The feeding zone and screw were respectively cooled to 50° C. and 60° C. The barrel temperatures were set at 150° C. for the first zone with a regular increase until 220° C. in the last die zone. The resulting melt temperature was measured in the polymer at 226° C.

Comparative Example A developed a die pressure of 295 bar and gave a smooth surface finish to the extrudate. The tensile strength at break was 17.6 MPa, the elongation at break was of 380%, and the hot-set measured at 15 min at 200° C. under a load of 0.2 MPa was of 50% with a permanent set of 0%.

This is a comparative working example of a new silane and multi-peroxide blend formulation as described in the application versus a standard highly efficient commercial product containing a single peroxide.

The new blends are equally highly efficient, but develop less pressure due to lower scortching and result in a better surface quality.

EXAMPLE 3

Composition:

Base polyethylene resin (Escorene LD 166 BA, with an MFL of 0.2 g/10 min at 190° C. under a load of 2.16 kg, and a density of 0.922 g/dm3): 86.9% by weight; a carbon black masterbatch (Black Plastback PE2737): 7% by weight; an anti-oxidant masterbatch (MBMM21085): 1.1% by weight; porous organic carrier pellets (Pearlene 200HD): 3.5% by weight; and a premixed blend of silane, peroxide and catalyst (A-171 vinyltrimethoxy silane: 91.5% by weight; 1,1 Di(tertbutylperoxy)-3,3,5-trimethylcyclohexane: 1.5% by weight; tert-butyl cumyl peroxide: 2% by weight; di-tertbutylperoxide: 2% by weight; dibutyltin dilaurate condensation catalyst: 3% by weight): 1.5% by weight.

Process:

The pre-mixed blend of reactants was absorbed into the porous organic carrier pellets by mixing at room temperature during 10 minutes. The polymer base resin, carbon black masterbatch, anti-oxidant masterbatch and porous carrier pellets (including the pre-mixed blend of reactants) were fed into the extruder using a gravimetric blender. The thermoplastic polymer formulation was extruded on a Troester single screw extruder equipped with a barrier screw of a diameter of 45 mm and a length of 25 l/d. No breaker plate was used and the screw speed was set at 20 rpm. The feeding zone and screw were respectively cooled to 50° C. and 60° C. The barrel temperatures were set at 150° C. for the first zone with a regular increase until 220° C. in the last die zone.

Example 3 gave a smooth surface finish to the extrudate. The hot-set measured at 15 min at 200° C. under a load of 0.2 MPa was of 50%.

COMPARATIVE EXAMPLE B

Composition:

Base polyethylene resin (Escorene LD 166 BA, with an MFL of 0.2 g/10 min at 190° C. under a load of 2.16 kg, and a density of 0.922 g/dm3): 86.9% by weight; a carbon black masterbatch (Black Plastback PE2737): 7% by weight; an anti-oxidant masterbatch (MBMM21085): 1.1% by weight; porous organic carrier pellets (Pearlene 200HD): 3.5% by weight; and a premixed blend of silane, peroxide and catalyst (A-171 vinyltrimethoxy silane: 92.5% by weight; di-tertbutylperoxide: 4.5% by weight; dibutyltin dilaurate condensation catalyst: 3% by weight): 1.5% by weight.

Process:

The pre-mixed blend of reactants was absorbed into the porous organic carrier pellets by mixing at room temperature during 10 minutes. The polymer base resin, carbon black masterbatch, anti-oxidant masterbatch and porous carrier pellets (including the pre-mixed blend of reactants) were fed into the extruder using a gravimetric blender. The thermoplastic polymer formulation was extruded on a Troester single screw extruder equipped with a barrier screw of a diameter of 45 mm and a length of 25 l/d. No breaker plate was used and the screw speed was set at 20rpm. The feeding zone and screw were respectively cooled to 50° C. and 60° C. The barrel temperatures were set at 150° C. for the first zone with a regular increase until 220° C. in the last die zone.

Comparative Example B gave a bad surface finish to the extrudate. The sample broke during the hot-set test at 15 min at 200° C. under a load of 0.2 MPa showing no thermomechanical resistance.

This is a comparative working example of a new silane and multi-peroxide blend formulation as described in the application versus a standard single-peroxide containing comparative formulation, used in a typical complete thermoplastic polymer formulation intended for electrical wiring. These examples also use porous organic polyethylene carriers to feed the blend of reactants.

Even at a higher peroxide content, a better surface quality is obtained. The higher peroxide content allows one to obtain the required hot-set performance not achievable with the comparative single-peroxide containing product.

EXAMPLE 4

Composition:

Base polyethylene resin (Exxon LL 4004 EL, with an MFL of 0.33 g/10 min at 190° C. under a load of 2.16 kg, and a density of 0.922 g/dm3): 98.4% by weight; an anti-oxidant/color masterbatch: 0.6% by weight; and a premixed blend of silane, peroxide and catalyst (A-171 vinyltrimethoxy silane: 93.75% by weight; 1,1 Di(tertbutylperoxy)-3,3,5-trimethylcyclohexane: 0.75% by weight; tert-butyl cumyl peroxide: 1.5% by weight; di-tertbutylperoxide: 1.5% by weight; dibutyltin dilaurate condensation catalyst: 2.5% by weight): 1.0% by weight.

Process:

The polymer base resin and anti-oxidant/color masterbatch were fed into the extruder using a gravimetric blender. The silane was injected in liquid form according to the Monosil process. The thermoplastic polymer formulation was extruded on a Nokia-Maillefer single screw extruder equipped with a barrier screw of a diameter of 120 mm and a length of 30 l/d. No breaker plate was used and the screw speed was set at 18 rpm. The feeding zone and screw were cooled to 80° C. The barrel temperatures were set at 150° C. for the first zone with a regular increase until 215° C. in the last die zone.

Example 4 gave a smooth and very glossy surface finish to the extrudate. The tensile strength at break was 13.2 MPa, the elongation at break was of 433%. The hot-set measured at 15 min at 200° C. under a load of 0.2 MPa was of 70%.

COMPARATIVE EXAMPLE C

Composition:

Base polyethylene resin (Exxon LL 4004 EL, with an MFL of 0.33 g/10 min at 190° C. under a load of 2.16 kg, and a density of 0.922 g/dm3): 98.2% by weight; an anti-oxidant/color masterbatch: 0.6% by weight; and a premixed blend of silane, peroxide and catalyst (A-171 vinyltrimethoxy silane: 93.75% by weight; 1,1 Di(tertbutylperoxy)-3,3,5-trimethylcyclohexane: 0.75% by weight; tert-butyl cumyl peroxide: 1.5% by weight; di-tertbutylperoxide: 1.5% by weight; dibutyltin dilaurate condensation catalyst: 2.5% by weight): 1.2% by weight.

Process:

The polymer base resin and anti-oxidant/color masterbatch were fed into the extruder using a gravimetric blender.

The silane was injected in liquid form according to the Monosil process. The thermoplastic polymer formulation was extruded on a Nokia-Maillefer single screw extruder equipped with a barrier screw of a diameter of 120 mm and a length of 30 l/d. No breaker plate was used and the screw speed was set at 18 rpm. The feeding zone and screw were cooled to 80° C. The barrel temperatures were set at 150° C. for the first zone with a regular increase until 215° C. in the last die zone.

Comparative Example C gave a smooth and glossy surface finish to the extrudate. The tensile strength at break was 15.5 MPa, the elongation at break was of 495%. The hot-set measured at 15 min at 200° C. under a load of 0.2 MPa was of 45%.

This is a comparative working example of a new silane and multi-peroxide blend formulation as described in the application used at 2 different loading levels in the compound. The conditions of processing were typical of industrial productions using a Monosil process.

The efficiency of the silane and multi-peroxide blends remains high even at very low use levels further reducing scorching and gel formation problems. During the trials ran according to industrial processing conditions on a full production line, no defects (gels, pitts or other irregularities) have been visible and a very smooth and glossy surface was obtained.

What is claimed:

1. A composition comprising:
   (i) at least one silane possessing an unsaturated organic function;
   (ii) at least two free radical initiators, the first initiator having a first 0.1 hour half-life temperature and the second initiator having a second 0.1 hour half-life temperature, said second half-life temperature being between 30° C. and 90° C. higher than said first half-life temperature;
   (iii) optionally one or more condensation catalysts;
   (iv) optionally, one or more stabilizers, stabilizer packages, inhibitors or free radical scavengers;
   (v) optionally, additives such as fillers, colorants and processing aids; and,
   (vi) at least one thermoplastic polyolefin selected from the group consisting of high-pressure low-density polyethylene, medium/low-pressure high-density polyethylene, low-pressure low-density polyethylene, medium-density polyethylene, an ethylene-α-olefin copolymer, polypropylene, an ethylene-ethyl acrylate copolymer, an ethylene-vinyl acetate copolymer, an ethylene-propylene copolymer, an ethylene-propylene-diene terpolymer, an ethylene-butene copolymer, polymethylpentene-1, polybutene, chlorinated polyethylene, an ethylene-vinyl acetate-chlorine terpolymer, and mixtures thereof.

2. The composition of claim 1 wherein the silane possesses the general formula RR'SiY$_2$ wherein R represents a monovalently olefinically unsaturated hydrocarbon radical or a radical selected from the group consisting of

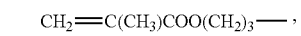,

 and

-continued

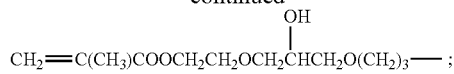;

each Y represents a hydrolysable organic radical and R' represents an R radical or a Y radical.

3. The composition of claim 2 wherein the R radical is selected from the group consisting of vinyl, allyl, butenyl, cyclohexenyl, cyclopentadienyl, and cyclohexadienyl.

4. The composition of claim 2 wherein the group Y represents a hydrolysable organic radical selected from the group consisting of alkoxy radicals, acyloxy radicals, oximato radicals and amino radicals.

5. The composition of claim 2 wherein the silane is vinyl triethoxysilane and/or vinyl trimethoxysilane.

6. The composition of claim 1 wherein the 0.1 hour half-life temperature of the first free radical initiator is from about 80° to about 160° C.

7. The composition of claim 1 wherein the 0.1 hour half-life temperature of the first free radical initiator is from about 90° to about 155° C.

8. The composition of claim 1 wherein the 0.1 hour half-life temperature of the second free radical initiator is from about 125° to about 190° C.

9. The composition of claim 1 wherein the 0.1 hour half-life temperature of the second free radical initiator is from about 140° to about 170° C.

10. The composition of claim 6 wherein the first free radical initiator is selected from the group consisting of di(2,4-dichlorobenzoyl) peroxide, tertbutyl peroxypivalate, dilauroyl peroxide, dibenzoyl peroxide, tert-butyl peroxy-2-ethylhexanoate, 1,1 -di(tert-butylperoxy)-3,3,5-trimethylcyclohexane, di(tert-butyl peroxy)cyclohexane, tert-butyl peroxy-3,5,5 -trimethylhexanoate, tert-butyl peroxyacetate, tert-butyl peroxybenzoate, di-tert-amyl peroxide, dicumyl peroxide, di(tert-butylperoxyisopropyl)benzene and 2,5-dimethyl-2,5-di(tert-butylperoxy)hexane.

11. The composition of claim 8 wherein the second free radical initiator is selected from the group consisting of tert-butyl peroxyacetate, tert-butyl peroxybenzoate, di-tert-amyl peroxide, dicumyl peroxide, di(tert-butyl peroxyisopropyl)benzene, 2,5-dimethyl-2,5-di(tert-butylperoxy)hexane, tert-butyl cumyl peroxide, 2,5-dimethyl-2,5 -di(tert-butylperoxy)hexyne-3 and di-tert-butyl peroxide.

12. The composition of claim 1 further comprising at least one additional component selected from the group consisting of oils, plasticizers, pigments and lubricants.

13. The composition of claim 1 where catalyst is a metal carboxylate, an organic metal compound, an organic base, or an acid.

14. The composition of claim 13 where metal carboxylate is dibutyltindilaurate, stannous acetate, stannous octoate, lead naphthenate, zinc octoate, iron-2-ethylhexoate, or cobalt naphthenate.

15. The composition of claim 13 where organic metal compound is a titanium ester or a titanium chelate.

16. The composition of claim 15 where a titanium ester or a titanium chelate is a tetrabutyl titanate, tetranonyl titanate, or bis-(acetylacetonyl) di-isopropyl titanate.

17. The composition of claim 13 where an organic base is ethylamine, hexylamine, dibutylamine or piperidine.

18. The composition of claim 13 where an acid is a mineral acid or a fatty acid.

* * * * *